Sept. 25, 1923.

C. R. KRONE 1,469,090

VEHICLE DIRECTION INDICATOR

Filed Sept. 21, 1920  2 Sheets-Sheet 1

WITNESS

INVENTOR
Carl R. Krone
BY
Ackerr + Totten
ATTORNEYS

Sept. 25, 1923. 1,469,090
C. R. KRONE
VEHICLE DIRECTION INDICATOR
Filed Sept. 21, 1920 2 Sheets-Sheet 2
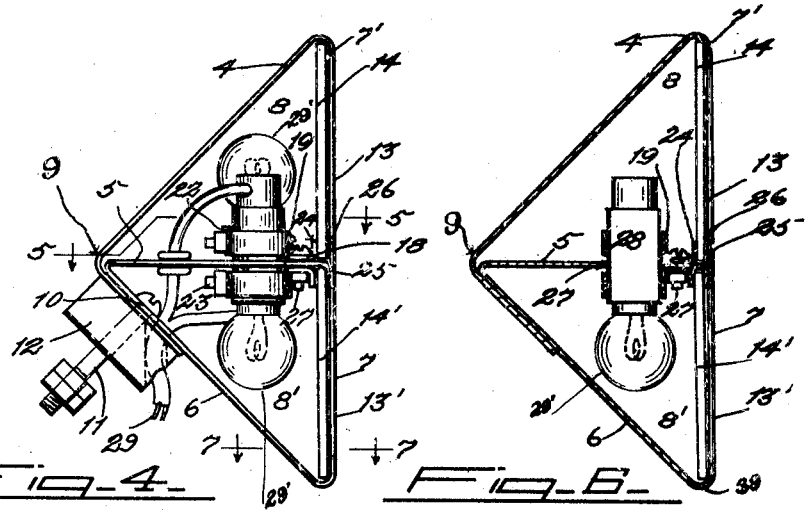
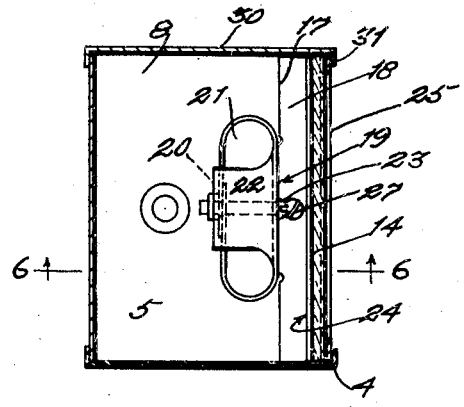
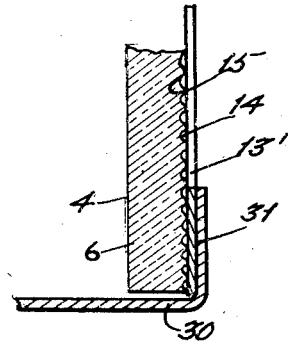
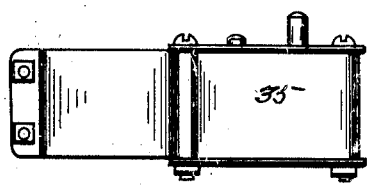
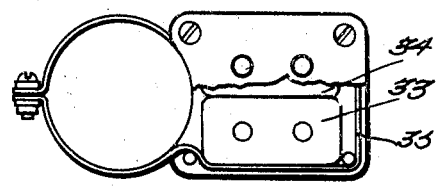
WITNESS
INVENTOR
BY
ATTORNEYS Patented Sept. 25, 1923.

1,469,090

UNITED STATES PATENT OFFICE.

CARL R. KRONE, OF OAKLAND, CALIFORNIA.

VEHICLE DIRECTION INDICATOR.

Application filed September 21, 1920. Serial No. 411,753.

*To all whom it may concern:*

Be it known that I, CARL R. KRONE, citizen of the United States, residing at Oakland, in the county of Alameda and State of California, have invented certain new and useful Improvements in Vehicle Direction Indicators, of which the following is a specification.

This invention relates to an improved direction indicating signal for vehicles for denoting the direction of travel or stop of a preceding vehicle to the vehicles following in the rear thereof, although the invention may be positioned at the forward part of the vehicle to denote its direction of travel to approaching vehicles or traffic officers.

The principal object of the present invention is to provide a signal preferably of the illuminated type containing direction denoting characters capable of selective indication to denote the direction of turn of the vehicle, and when simultaneously operated to complete a well known character denoting a stop of the vehicle.

A further object of this invention is to incorporate the well known red and green colors in connection with the direction denoting character to indicate the turn to the right or left of a vehicle, and when simultaneously illuminated to complete the full outline of the character to denote the stop.

A further object of the invention is to provide a signal construction formed of a single sheet of material bent upon itself to provide a triangular construction in end elevation affording an inclined surface for attachment to and resting on a vehicle fender and a vertical base wall observable from the end of the vehicle.

A further object is to provide a casing construction, which, due to its simple construction, is capable of being cheaply manufactured and quickly assembled.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention reference is directed to the accompanying drawings, wherein:—

Figure 4 is a view in end elevation of the signal casing with one of the end closure members removed.

Figure 5 is a sectional view taken on line 5—5 of Figure 4.

Figure 6 is a sectional view taken on line 6—6 of Figure 5.

Figure 7 is a fragmental sectional view taken on line 7—7 of Figure 4.

Figure 8 is a broken top plan view of the electrical switch mechanism, and

Figure 9 is a view in side elevation of the switch illustrated in Figure 8.

Figure 1:
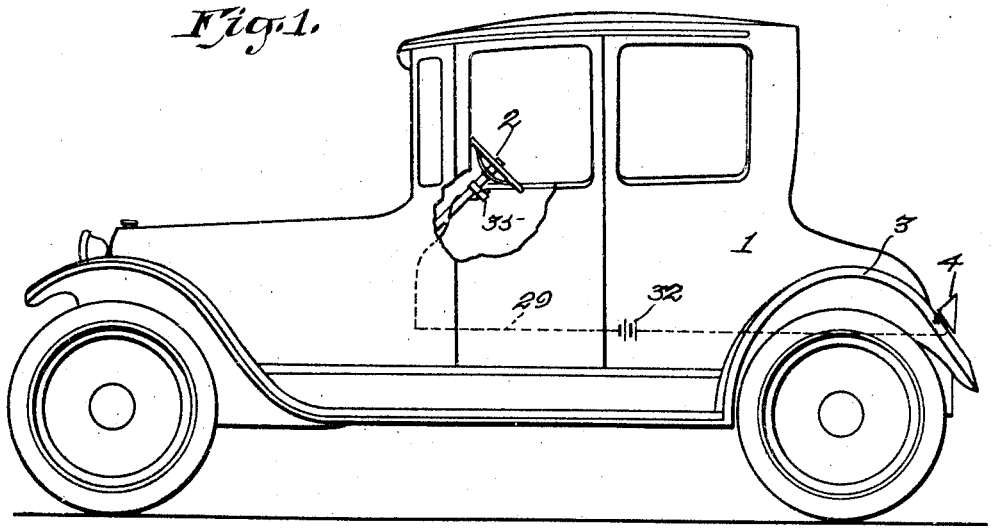
Figure 1 is a view in broken side elevation of a vehicle mounting my improved signal.
Figures 2, 3, 10:
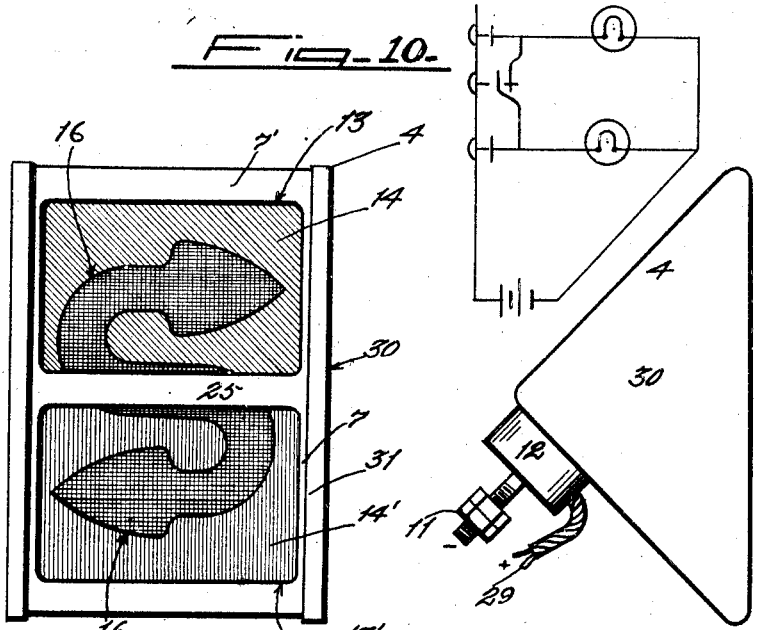
Figure 2 is a view in front elevation of the signal casing.
Figure 3 is a view in end elevation of the signal casing.
Fig. 10 is a circuit diagram disclosing the selective and simultaneous control for the respective lamps.

In the drawings, wherein like characters of reference designate corresponding parts:—1 indicates a vehicle provided with the usual steering post 2 and fenders 3. Illustrated as mounted on the rear portion of the left rear vehicle fender 3 is a signal casing 4 formed preferably of sheet tin. The material in the formation of the casing is bent about a small triangular die block, not shown, to provide a chamber top wall 5 disposed in a preferably horizontal position, and downwardly inclined from which extends the wall 6. From the wall 6 extends the base wall 7 of the casing, the same extending beyond the terminal end of the wall 5, the distance corresponding to the distance between the walls 6 and terminal end of the wall 5, forming the end wall 7' for an upper chamber 8. The terminus of the end wall 7' is bent angularly downwardly toward the junction of walls 5 and 6 to a point as at 9 and overlaps the wall 6, as in Figures 4 and 6 of the drawings. At this overlapping point, the casing forming material is provided with aligned bolt receiving openings 10 through which pass a securing bolt 11, and which bolt also passes through a mounting block 12 adapted to rest on the vehicle fender, and the bolt passes through the fender and provides a securing means for attaching the casing thereto. The formation of the casing provides therein the upper chamber 8 and lower chamber 8' divided by the wall 5, and it will be observed that the entire casing construction is triangular in end elevation and that each chamber is rectangular in end elevation. The casing base wall 7 at points communicating with the respective chambers 8 and 8' is provided with the cut out portions or openings 13 and 13', one registering with each of the respective chambers. Insertable from the ends of the chambers 8 and 8', preferably in rear of the respective openings 13 and 13' are transparent members 14 and 14' preferably of glass, and of a type formed with vertical corrugations 15. The glass 14 covering the opening 14 of chamber 8 is preferably green in color, while the glass covering the openings 13' in chamber 8' is preferably red, and said glasses each have incorporated therewith a direction denoting character 16. The character associated with glass 14 having its terminal directed toward the right of the casing, while the character associated with the glass 14' has its terminal directed toward the left of the casing, the character being of a substantial S formation, with the upper half overlying the glass 14 and the lower half overlying the glass 14', and this character may be either white or black, or of any suitable opaque material, so that on the illumination of the chambers, the outline of the character will be observable through the glass.

It will be observed that by utilizing a character of S formation, with the upper half thereof outlined on a green background with its terminal pointed to the right and with the lower half outlined on a red background with its terminals pointed to the left, on the illumination of the respective chambers in accordance with the direction of turn of the vehicle, a signal is given both by the well known color universally used in maritime signalling and with an arrow to denote the direction of turn of the vehicle, and when both chambers are illuminated the complete character is outlined denoting the S indicating a stop movement, outlined one half on a green background and the other half on a red background.

Suitable lamp supporting brackets are mounted on the opposite sides of the chamber dividing wall 5, as indicated in Figures 4, 5 and 6 of the drawings, and the same are preferably constructed in the following manner:—

A strip of material of a length corresponding to the width of the wall 5 is angularly cut from opposite ends providing the edge 17, and the uncut portion is bent at right angles to the main portion 18 providing a wall 19, and the portions formed by said inward cut are looped with their free ends in overlapping relation as at 20 to provide socket receiving openings 21. A portion of the body at the free edge of the wall 19 is bent at right angles to the wall 19 outwardly in line with the wall 18 to provide a separating wall 22 between the socket receiving openings 21. A tie bolt 23 unites the overlapping ends 20 of the members, as in Figure 5 of the drawings. The forward edge of the portion 18 is flanged as at 24, and said flanged portion extends parallel with and in slight spaced relation to the inner face of the dividing wall 25 separating the openings 13 and 13' providing at one side of the wall 5 between the inner face of the dividing wall 25 and the flange 24, a receiving groove 26, within which is inserted the edge of one of the opening covering transparent members.

One of the brackets is mounted on each side of the wall 5, and the same are secured in position by a bolt 27. It will be apparent that each of the brackets is provided with two sockets, and said sockets are in register with openings 27 formed in the wall 5 and within each pair of socket receiving openings are positioned the sockets 28, each of which mounts a lamp 29', one positioned in each chamber. From each of the sockets extends the positive wire 29 of an electrical circuit, the negative wire of which connects through the bolt 11 of the vehicle chassis. To close the opposite sides of the casing, I provide end closure members 30 having flanged edges 31 for removably positioning over opposite ends of the casing.

To selectively or simultaneously illuminate the respective chambers, the respective positive circuit wires 29 pass through a battery 32 and connect with the respective switches 33 and 34 carried by a casing 35 secured to the vehicle steering post 2; each of the switches being illustrated as the push button type and of a construction on the depression of certain buttons to cause lighting of the lamps 29' either selectively or simultaneously, depending on which switch is actuated.

From the present construction, it will be readily apparent that the illumination of one chamber does not affect or transmit light through the glass of the other chamber, as the chambers are separated or divided from each other.

In the improved signal construction, it will also be readily apparent that the conventional S figure disposed with its upper half associated with one chamber, and its lower half associated with another, that the signalling as to the direction of turn or stop of the vehicle is easily accomplished.

To permit the escape of condensation from within the casing, I provide certain apertures 39 in the casing forming material.

I claim:—

1. A vehicle direction indicator comprising a casing substantially triangular in end elevation and formed of a single sheet of material bent in triangular form with a portion extending at right angles inwardly from the base to the apex, dividing said casing into upper and lower chambers, the base wall of said triangular casing being provided with a pair of openings, one communicating with each chamber and arranged adjacent to each other, end members for detachably positioning, one over each end of the casing, a transparent member associated with each opening and each of a color differing from the other, a direction denoting character associated with each transparent member, an illuminating member within each chamber, means for selectively or simultaneously operating said respective illuminating members.

2. A vehicle direction indicator comprising a casing substantially triangular in end elevation and formed of a single sheet of material bent in triangular form with a terminal portion extending at right angles inwardly from the base to the apex dividing the interior of said casing into two chambers, each of a triangular configuration in end elevation, flanged end members for removably positioning over the opposite ends of said casing to close said chambers, the casing base wall being formed with a pair of openings one communicating with each chamber, a transparent member over each opening, and a direction denoting character associated with each transparent member.

3. A vehicle direction indicator comprising a casing substantially triangular in end elevation and formed of integrally assembled face walls, a member integral with the casing wall and extending transversely of the interior thereof for dividing the same into upper and lower compartments, one wall of said casing being provided with a pair of openings, one communicating with each compartment, a transparent member closing the respective openings and removably positioned within the respective compartments by a transverse movement across the same, a flanged lamp supporting bracket within each compartment and secured to opposite sides of said casing dividing member, said lamp supporting brackets each formed with a flange providing a guide wall within each compartment for the respective transparent members, a lamp carried by each bracket and extending one into each compartment, and removable end members for closing the opposite ends of said triangular casing.

4. A vehicle indicator comprising a casing having a wall and means outlining a substantially S-shaped character in said wall with its terminals substantially parallel and pointing in opposite directions, and means for independently or simultaneously illuminating halves of said character, each half including all of one of said terminals.

In testimony whereof I have signed my name to this specification.

CARL R. KRONE.